A. HIGLEY.
Grain Separator.
No. 1,662. Reissued May 3, 1864.
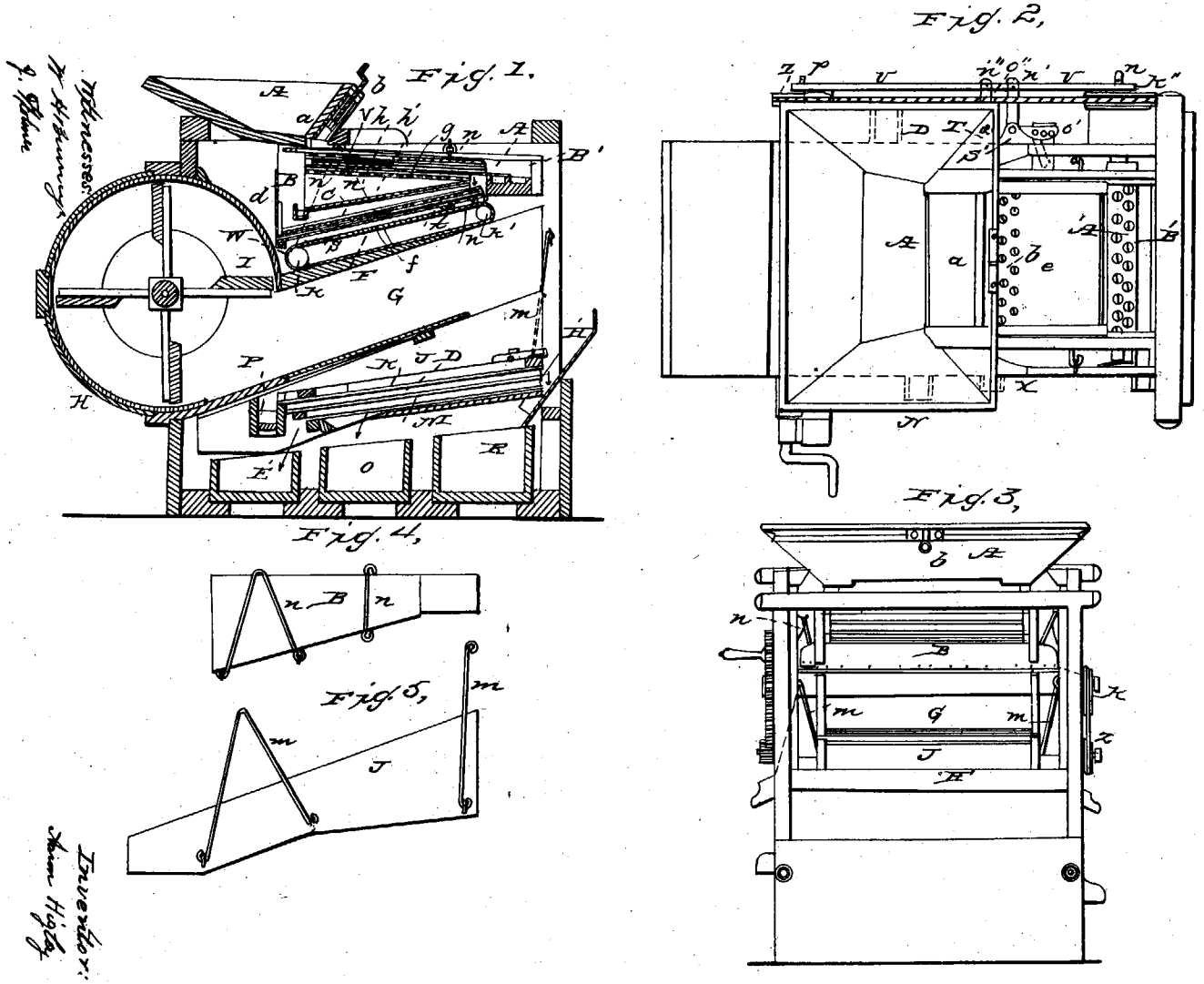
N. PETERS, Photo-Lithographer, Washington, D. C.

UNITED STATES PATENT OFFICE.

AARON HIGLEY, OF WARREN, OHIO.

GRAIN-SEPARATOR.

Specification forming part of Letters Patent No. 33,838, dated December 3, 1861; Reissue No. 1,662, dated May 3, 1864.

*To all whom it may concern:*

Be it known that I, AARON HIGLEY, of Warren, in the county of Trumbull and State of Ohio, formerly of Sand Creek, Minnesota, have invented new and useful Improvements in Grain-Separators; and I do hereby declare that the following is a full and complete description of the construction and operation of the same, reference being had to the accompanying drawings, marking part of this specification, in which—

Figure 1 is a longitudinal vertical section. Fig. 2 is a top view. Fig. 3 is an end view, and Figs. 4 and 5 are detached parts.

Like letters refer to like parts in the several views.

The nature of my invention relates to the peculiar construction and arrangement of sieves, to the suspension and motion of the shoes or shakers containing them, and the peculiar motion given thereto, to the endless conveyer, to the fan and seed-drawers, whereby provision is made for separating different kinds of grain in the most effective and thorough manner, and depositing the same in separate receptacles, free from all impurities, such as chess, cockle, and tailings, as hereinafter more fully described.

To enable others skilled in the art to make and use my invention, I will proceed to describe its construction and operation.

The frame of the machine is constructed in the usual manner, and closed in front and on the two sides, with the exception of openings in the sides to allow a current of air to pass into the fan.

A is a hopper, with downwardly-converging sides and inclined bottom, secured on the top and forward portion of the machine, and provided at its rear end with a seed-aperture and sliding valve, *a*, for varying the size of the aperture, and consequently regulating the flow of seed on the sieves. This valve is moved up and down by a screw-bolt, *b*, which has a crank on its upper end, the screw working through a nut, *c*, on the back side of the valve *a*. A recess in the end of the hopper allows the nut to move up and down on the screw.

B is a shoe suspended from the top and sides of the frame by four links, *n*, two on each side. (Shown in dotted lines in Fig. 1.) The front portion of said shoe is partially closed by a board, *d*, and is entirely open at the bottom. The back end of this shoe has two troughs, A′ B′, one behind the other, and inclined so as to discharge their contents on opposite sides of the machine, as hereinafter to be more fully explained.

Sieves *e f g* are inclined rearwardly and secured equidistant apart in the upper portion of the shoe B. The back end of these sieves empty into the inclined troughs A′ B′, at the back end of the shoe. The front half of the upper sieve, *e*, only is punctured, the remaining half being smooth. The sieve *f* is offset in the middle, and its entire surface punctured somewhat finer than the sieve *e*. The object of the offset is to allow the imperforate plate *o* to be placed so as to cover the openings in the rear half of the sieve *f* and have the surface flush or level with the front portion of the sieve, for the purpose hereinafter to be fully explained. Sieve *g* is punctured still finer than the one above it, and the front half of this is also covered with an imperforate plate, *v*. Immediately beneath the sieve *g* a fine wire sieve, *h*, is secured at each side, upon wedge-shaped pieces *h′*, the points of which are toward the back end of the shoe. This fine sieve *h* inclines in the same direction with the sieve above it.

C is a chute or incline secured to the bottom of the wedge-shaped pieces *h′* and provided at its lowest edge with a trough, *q*, inclining transversely of the shoe, and discharging through the spout X. (Shown partly in dotted lines in Fig. 2.)

*i j* are sieves punctured over their entire surface, the under one, *j*, being the finest. The lower half of the upper one, *i*, is offset, and the openings covered by an imperforate plate, *s*, and the upper half of the under sieve is also covered with a similar plate, *t*. Both of these sieves discharge at their lower end into an inclined trough, W, attached to the lower extremity of the board *d*, which conducts its contents out at one side of the machine through the spout D.

F is an endless apron which passes over rollers *k k′*, from the latter of which it receives motion from the fan-shaft through the medium of a crossed cord or belt, Z, passing a grooved pulley on one end of the roller, and around a pulley on the fan-shaft. (Shown at Z′.)

G is an inclined trunk, connected at its front end with the fan-box H, in which a blast is created by the action of the rotary fan I, which consists of four radial arms secured to a shaft journaled in boxes attached to a frame outside of the fan-box. These arms are provided with floats with annular disk-rings attached to their edges, fitted to revolve within the box.

J represents a shoe or shaker, also suspended by links shown in dotted lines, and also at *m m*, in Fig. 5. The links of this shoe are longer than the links *n* of the upper shoe, previously described, and receives its motion in such a way, as hereinafter described, that its vibrations are slower and longer than that of the upper shoe, which are short and quick. This lower shoe is provided with three sieves, K L M, the upper one of which is formed of a perforated plate, and the others are formed of wire-netting, the bottom sieve being the finest. The upper sieve, K, discharges the grain at its lower end through the spout N, the cockle and other refuse matter passing through the meshes of both the sieves under it into the drawer O, and the small grain, which falls onto the sieve L with the cockle, passes over the lower end into the trough P. From thence it is conducted to one side of the machine.

Q is an adjustable guard attached to the back end of the upper sieve, K, so that it can be adjusted to project a greater or less distance over the edge of the sieve to catch the heavier grains falling from the apron. The lighter grains, being blown against the inclined board H′, fall into the drawer R.

S T are two vertical shafts working in boxes at the top and bottom, attached to one side of the frame. Each of these shafts is provided with two arms, *n′ o′ n″ o″*, placed at right angles to each other. The *n′* is connected by a connecting-rod, U, to a crank, *r*, on the fan-shaft, and the arm *o′* is connected to the shoe B by a short connecting-rod, by means of which a vibratory shaking motion is imparted to the shoe B.

The shoe J is connected to the arm *n″* of the vertical shaft T, which receives motion from a crank, *p*, on the pulley *k″*, through the medium of the connecting-rod V. The upper shoe, being connected directly with the crank on the fan-shaft, has double the motion of the lower shoe, for the pulley *k″* has twice the diameter of the driving-pulley on the fan-shaft.

The operation of this machine is as follows: The fan I being set in motion, and the grain to be cleaned placed in the hopper, the grain falls upon and through the openings in the upper sieve, *e*, through the sieve *f*, onto the imperforate plate *v* of the sieve *g*; from thence it slides onto the wire-screen *h*, which separates the grass seed from the grain, the grass-seed passing through the meshes and falls upon the inclined bottom C, and sliding into the trough *q*, by which it is conducted out at one side of the machine through the spout X. The grain and cockle, passing over the lower end of the wire-sieve, fall upon the upper end of sieve *i*, where the grain is again separated from the oats, the oats passing over the imperforate plate *s* into the trough, and the seed and cockle passing onto the imperforate plate *t* of sieve J, thence through and upon the endless apron F. Any oats which chance to fall through upon this sieve *j* are conveyed into the trough W and discharged through the spout D. The grain and cockle which fall on the endless apron is carried up to the upper end and precipitated upon the sieve K in the lower shoe at the same time the tailings are blown out by the blast created by the fan I. The sieve K separates the smaller seeds and cockle from the larger or seed grain, the latter passing out at the side of the machine through the spout P, while the former passes through the sieve and is separated from the cockle and discharged through the spout on the side of the machine opposite from where the seed-grain is discharged. The cockle falls into the drawer *o*, and any seed that has chanced to work through with the cockle upon the sieve M passes over the end into the drawer E. The drawer R is to catch any grain that may be blown over the back end of the lower shoe. The grain striking against the deflector H′ is directed into the drawer.

Trough A′ is covered with a sieve for the purpose of separating the oats that escape over the sieve *e* from the straw and other refuse matter, the oats passing out of the same spout with those that pass through the sieves, the straw and other matter passing out of the trough A′.

In cleaning grain for the market the sieve K is removed, and the grain is allowed to fall directly upon the sieve L.

The object of the imperforate plates on one-half of the sieves in the upper shoe is to have the grain fall from one sieve upon another on a smooth surface and then gradually slide upon the perforated part, instead of falling directly thereon. This allows the oats to lie flat in passing over the sieve, and thereby prevents them from passing through. When it is desired to expedite the cleaning and separating process, these imperforate plates are removed. This allows the grain and refuse matter to pass through the sieves more rapidly, but the process of cleaning and separating is not so thorough.

A machine constructed as above described is well adapted for cleaning and separating all kinds of grain in the most thorough and effective manner.

What I claim as my improvement, and desire to secure by Letters Patent, is—

1. The shoes B J, when superimposed one above the other, being suspended and operated in such a way as to cause the lower shoe to vibrate with less velocity than the upper one, and so arranged as to admit a wind-spout, G, to be interposed between said shoes.

2. So hanging and operating the lower shoe that its lateral vibration shall be at a less velocity and longer stroke than the upper shoe, as and for the purpose specified.

3. The arrangement of the hopper A, sieves *e f g h i j*, imperforate plates *o v*, and troughs A′ B′ W X, with shoe B, the whole combined and operating in the manner and for the purpose set forth.

4. The arrangement of the sieves in the shoe B, with the endless apron F, trunk G, fan I, sieves K L M in the shoe J, and drawers E O R, the whole combined and operating in the manner and for the purpose described.

5. The combination of the sliding gate or valve *a*, screw-bolt *b*, and nut *c*, for regulating the size of the seed-aperture in the hopper H, substantially as described.

AARON HIGLEY.

Witnesses:
WILLIAM GUDE,
CHAS. B. GRINNELL.